United States Patent
Eaton et al.

(10) Patent No.: US 8,990,325 B2
(45) Date of Patent: Mar. 24, 2015

(54) REAL-TIME AND INTERACTIVE COMMUNITY-BASED CONTENT PUBLISHING SYSTEM

(75) Inventors: Steven Eaton, Louisville, KY (US); Ryan Goodlett, Louisville, KY (US); Daniel Gould Hobbs, San Francisco, CA (US); Jeremy Lwanga, Louisville, KY (US)

(73) Assignee: CBS Interactive Inc., San Francisco, CA (US)

( * ) Notice: Subject to any disclaimer, the term of this patent is extended or adjusted under 35 U.S.C. 154(b) by 368 days.

(21) Appl. No.: 13/460,770

(22) Filed: Apr. 30, 2012

(65) Prior Publication Data

US 2013/0290516 A1     Oct. 31, 2013

(51) Int. Cl.
*G06F 15/16*  (2006.01)
*G06F 17/30*  (2006.01)

(52) U.S. Cl.
CPC .................................. *G06F 17/3089* (2013.01)
USPC ....................................................... 709/206

(58) Field of Classification Search
None
See application file for complete search history.

(56) References Cited

U.S. PATENT DOCUMENTS

| | | | |
|---|---|---|---|
| 7,702,728 B2 * | 4/2010 | Zaner et al. | 709/205 |
| 8,732,193 B2 * | 5/2014 | Skeen et al. | 707/769 |
| 2004/0202117 A1 * | 10/2004 | Wilson et al. | 370/310 |
| 2005/0172001 A1 * | 8/2005 | Zaner et al. | 709/205 |
| 2005/0232423 A1 * | 10/2005 | Horvitz et al. | 380/255 |
| 2006/0155785 A1 * | 7/2006 | Berry et al. | 707/204 |
| 2006/0230153 A1 * | 10/2006 | Li | 709/227 |
| 2007/0033250 A1 * | 2/2007 | Levin et al. | 709/204 |
| 2009/0276713 A1 * | 11/2009 | Eddy | 715/733 |
| 2011/0246484 A1 * | 10/2011 | Dumais et al. | 707/749 |
| 2011/0276628 A1 * | 11/2011 | Pell | 709/204 |
| 2012/0042020 A1 * | 2/2012 | Kolari et al. | 709/206 |
| 2012/0185544 A1 * | 7/2012 | Chang et al. | 709/206 |
| 2012/0233258 A1 * | 9/2012 | Vijayaraghavan et al. | 709/204 |
| 2012/0284638 A1 * | 11/2012 | Cutler et al. | 715/751 |
| 2013/0073377 A1 * | 3/2013 | Heath | 705/14.39 |
| 2013/0124653 A1 * | 5/2013 | Vick et al. | 709/206 |
| 2013/0325970 A1 * | 12/2013 | Roberts et al. | 709/206 |
| 2014/0089411 A1 * | 3/2014 | Rubin et al. | 709/204 |
| 2014/0181217 A1 * | 6/2014 | Jolfaei et al. | 709/206 |
| 2014/0201292 A1 * | 7/2014 | Savage et al. | 709/206 |
| 2014/0222930 A1 * | 8/2014 | Gangadharan et al. | 709/206 |
| 2014/0223335 A1 * | 8/2014 | Pearson | 715/753 |

OTHER PUBLICATIONS

Twitter; TweetDeck Updated: Lists, Activity, Media and more; Mar. 22, 2012; p. 2.*

* cited by examiner

*Primary Examiner* — Brian P Whipple
(74) *Attorney, Agent, or Firm* — Mahamedi Paradice LLP (57) ABSTRACT

A system and method is provided to enable clients to interact with a content resource (e.g., a webpage) in real-time, so that contributions from each client terminal is communicated to the other client terminals in real-time. Each client terminal can respond to real-time updates by locally updating the content resource to include most recent contributions.

20 Claims, 6 Drawing Sheets

REAL-TIME AND INTERACTIVE COMMUNITY-BASED CONTENT PUBLISHING SYSTEM

TECHNICAL FIELD

Embodiments described herein pertain to a system and method for providing a real-time and interactive community-based content publishing system.

BACKGROUND

Web pages and content are increasingly becoming more interactive and community-based. For example, social networks such as provided by TWITTER INC. enable multi-person participation of community-based content (e.g., Tweets, replies, etc.). Users of such social networking services typically access the social network feeds using web browsers or browser-based applications. When updates to a given social networking feed occur, the browser or application that is used to view the feed typically initiates a request for the updated content. The result is that the browser or application refreshes to display the updated content.

DETAILED DESCRIPTION

Embodiments described herein enable a system and method for providing interactive content to a community of clients in real-time. In particular, embodiments enable multiple clients to interact with a content resource (e.g., a webpage), so that contributions from each client is communicated to the other clients in real-time.

According to an embodiment, a content provider establishes a real-time connection with each client in the community of clients. The real-time connection can be established in context of a content resource that is provided to the community of clients from the content provider. An event is detected that corresponds to a content submission from one or more of the clients in the community. In response to detecting the event, a communication is sent to each client in the community using the real-time connection with that client. Each client is able to update the content resource to include one or more changes that reflect the content submission.

One or more embodiments described herein may be used to implement an online debate forum. In the debate forum, content submissions from debaters and monitors are communicated to the clients in the community of the debate forum in real-time. Additional content submission, such as from viewers, can also be presented for commentary. Additional applications or usages for embodiments described herein include, for example, live blogging, online help centers, multi-party chat sessions, live message threads and others.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

Overview

Figure 1:
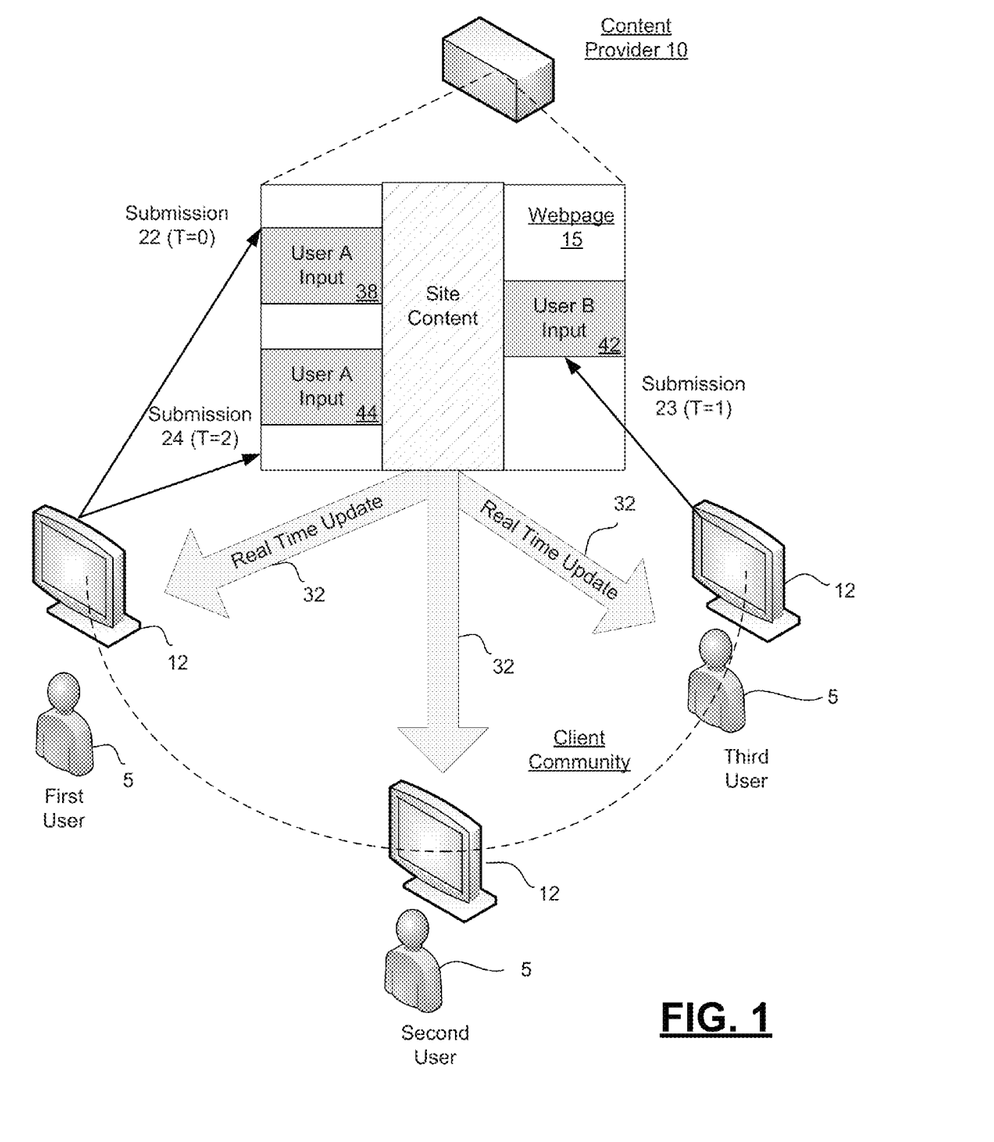
FIG. 1 illustrates an overview of a real-time publishing system for providing interactive, community-based content, under an embodiment.

FIG. 1 illustrates an overview of a real-time publishing system for providing interactive, community-based content, according to one or more embodiments. In an example of FIG. 1, a community is shown in the form of users 5 who operate client terminals 12 to view and interact with a content resource provided from a content provider 10. The content resource can correspond to, for example, web-based content, such as a webpage 15 that originates from the content provider 10 and which is updated over a given time period. The webpage 15 can be interactive and community-based. Thus, one or more of the users 5 can operate their respective terminals 12 to add or modify content provided with the webpage 15.

Furthermore, as described by various embodiments, the webpage 15 can be provided to the various terminals in a real-time and interactive mode. In such mode, one or more of the terminals is able to provide input to add or modify the content, and resulting changes to the webpage 15 are implemented in real-time on all of the client terminals 12. As described by various embodiments, the individual client terminals 12 each implement the same changes to the webpage 15 when provided a content update that results from a submission originating from one or more of the terminals 12.

In an example shown by FIG. 1, multiple users 5 view the webpage 15, and two users 5 provide submissions which result in the webpage 15 being modified or updated. In the example shown, a first terminal 12 of a first user 5 transmits a first content submission 22 to the content provider 10 at a first instance (time=0). In response to receiving the first content submission 22, the content provider 10 transmits a real-time update 32 to the other terminals that are viewing the webpage 15. The real-time update 32 specifies a content element 38 that corresponds to, or is based on the first submission 22.

Each terminal 12 in the community can respond to the real-time update 32 by locally updating the webpage 15 to include the most recent content element 38. The update to the webpage 15 on each terminal 12 can be based on the content element that is transmitted as part of the real-time update. As described with various embodiments, the transmission of the content element may be in the form of a message, such as communicated from the content provider 10 (or service provided thereof), using a websocket connection. Other real-time connections may alternatively be used in place of websocket connections, in order to enable the content provider 10 to initiate (e.g., push) changes to the webpage 15 to the client terminals 12.

With further reference to the example shown by FIG. 1, a second terminal 12 transmits a second content submission 23 at a second instance (time=1). For example, the user of the second terminal 12 may respond to the first content submission 22 from the first user. In response, the content provider 10 can transmit another real-time update 32 to the other terminals that are viewing the webpage 15. The next real-time update 32 can cause each of the terminals 12 to update the webpage 15 with the content element 42, corresponding to the second content submission 23 from the second user. Thus, for example, the terminal 12 of the first user 5 can receive the real-time update 32, based on the second content submission 23 from the second user. The first user 5 can respond again, or otherwise provide another content submission 24 (e.g., at a third instance t=2), which is then rebroadcasted as another real-time update 32 to the other terminals 12. The next real-time updates results in each of the terminals including the content element 44, corresponding to the most recent submission from the first user 5.

Various applications and usages can be implemented using a real-time, interactive community-based forum such as shown and described by an embodiment of FIG. 1. For example, an online debate forum can be implemented to enable a debate between persons that operate two or more client terminals, with participation from other users who operate client terminals and provide a role of monitor or audience. In variations, an online chat forum can be implemented between multiple users, with communications provided by individual participants being communicated to all participants in real-time. Still further, numerous other examples are discussed herein which utilize a real-time, interactive and community-based publishing system for online content.

System Description

Figure 2:
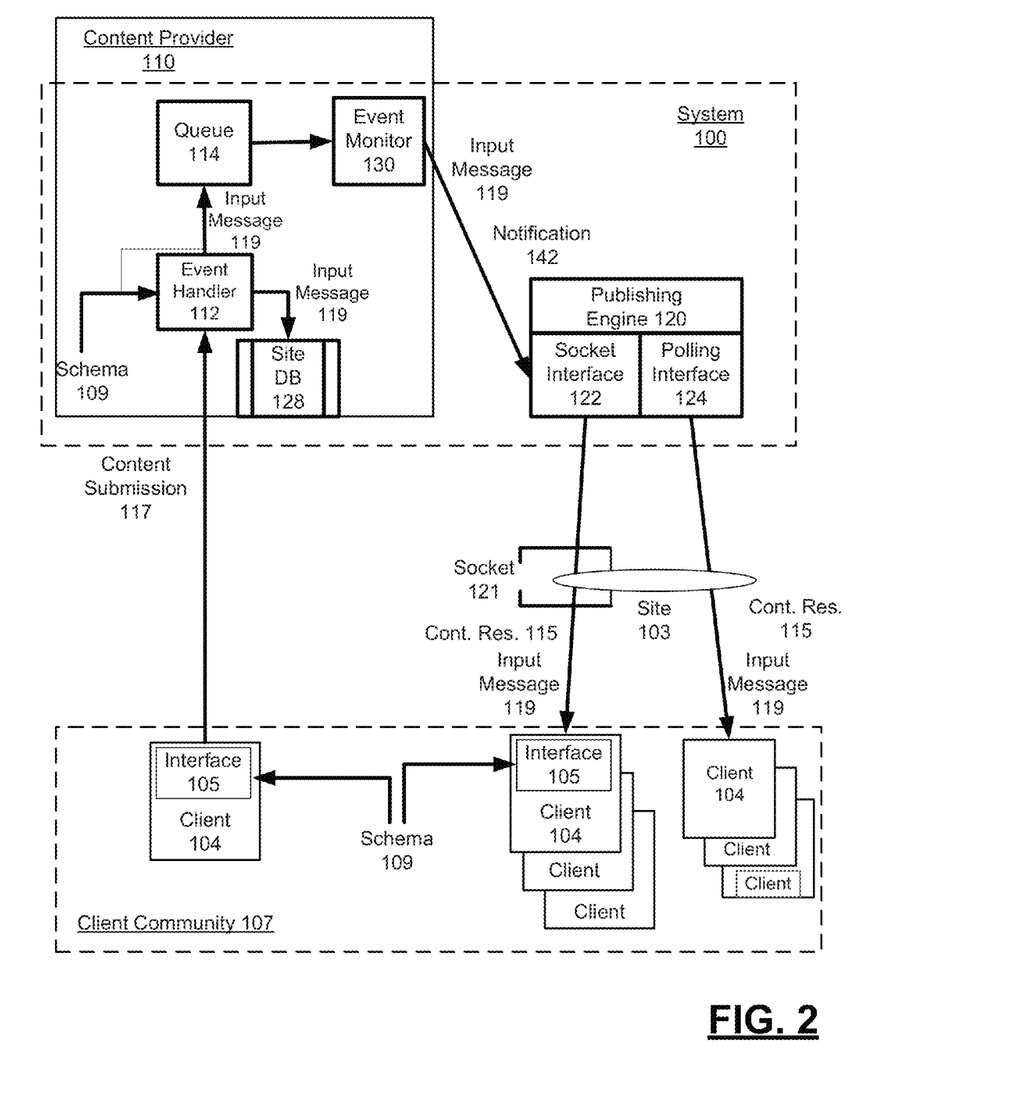
FIG. 2 illustrates a real-time publishing system for providing interactive community-based content, according to an embodiment.

FIG. 2 illustrates a real-time publishing system for providing interactive, community-based content, according to one or more embodiments. A system 100 as described in an example of FIG. 1 can be implemented on, for example, a server or combination of servers, so as to provide a service for web-based content publishing. In an embodiment, system 100 includes components that comprise a framework or service for use in publishing content from a given website or web-resource. In some variations, the system 100 can be used as a framework or service for third-party content providers.

In an embodiment, system 100 operates in connection with a website or host for content ("content provider 110") to provide real-time, community-based interactive component for clients 104 that comprise a community 107 (e.g., interactive audience) for a resource 115 (e.g., web page) provided from the content provider 110. The content provider 110 can include a server (or set of servers), with use of a combination of local or remote components that combine to enable functionality of system 100. In an embodiment, the system 100 includes an event handler 112, an event queue 114, an event monitor 130, and a publishing engine 120. In some implementations the publishing engine 120 is provided separate (e.g., on different server or domain) from the content provider 110, although variations enable some or all of the components of the system 100 to be hosted together or remote from one another.

The content provider 110 can be provided as a website on which, for example, a framework for providing interactive, community-based content is provided. As examples, the content provider 110 can include a site that enables one or more of blogging, chatting, topical message posting (e.g., message boards), content sharing, and/or interactive debating. More generally, the content provider 110 can include a site in which content is provided and/or updated by way of input from one or more site users that comprise a community of users for the content provider 10.

In some embodiments, the content provider 110 can be operated as a website that is accessible to a community of clients 104 (e.g., browsers) through browser/web-based interaction. The content provider 110 can be operated as, for example, a website that operates in a real-time community-based interactive mode for discrete durations of time, while during other times, the website is made available to clients through a conventional Hypertext Transfer Protocol (HTTP) protocol.

In one embodiment, the content provider 110 can be located by clients 104 via a network site 103 (e.g., identifiable through a first uniform resource locator (URL)). The content provider 110 can be triggered, or activated into the real-time interactive mode based on triggers such as provided by a clock (e.g., certain time of day or week) or by manual input (e.g., from a site administrator). Prior to being operated in an interactive real-time mode, the clients 104 can use HTTP or other standard protocol to view existing content provided at that site. When triggered into the interactive real-time mode, individual clients 104 in the community can establish websocket connections 121 which enable content updates from individual clients 104 of the community to be communicated to the clients 104 of the community 107 in real-time, without need for the individual clients 104 to request updates or perform refresh operations.

Generally, a websocket is an example of a real-time connection between a browser or browser-based application and a server, in which the server is able to provide data to the client without a corresponding client request. An example of a websocket is provided through a Websocket Protocol, standardized by the Internet Engineering Task Force ("IETF") as RFC 6455 and implemented as part of HTML5. The WebSocket Protocol enables two-way communication between a client and a server.

The content provider 110 can provide the clients that have loaded the content resource 115 (e.g., the site page) with an interface 105 for establishing a websocket connection. In an embodiment, the interface 105 can be provided through a Javascript code that executes with the webpage to trigger the client 104 (e.g., browser) into forming a websocket connection 121 with a websocket interface 122 of publishing engine 120. In this way, the websocket interface 122 of the publishing engine 120 establishes a plurality of websocket connections 121 with multiple clients 104 that have accessed the content provider (e.g., website) over a network. As described, the websocket connections 121 enable postings, updates or other forms of submissions that originate from clients 104 of the community to be communicated from the content provider 110 to the clients 104 in real-time.

According to some embodiments, when the content provider 110 is operated in a real-time, interactive community-based mode, the websocket interface 122 of the publishing engine 120 and the interfaces 105 of the respective clients 104 can be triggered to exchange communications in accordance with a handshaking protocol that results in the establishment of the websocket connections 121. Once a web websocket connection 121 is established for a given client (e.g., browser or browser-based application), the websocket connection 121 enables the client to receive content and/or data from the publishing engine 120, without need for the client make a corresponding request from the publishing engine 120. As an example, the websocket connection 121 can enable the browser (client 104) to receive and render a content update for a webpage, without the need for the browser to be refreshed, or otherwise make repeated request from the server (as would be the case with conventional HTTP requests between browser and server). The websocket connection 121 can also enable the browser (or client 104) to update an element or portion of the webpage automatically, and in-real-time, without need for the browser to request the update or otherwise perform the refresh operation.

In some embodiments, the websocket interface 122 provides the clients 104 with scripts or other functionality corresponding to the interface 105, which initiate the handshaking protocol and subsequent connection with the websocket interface 122. Thus, the interface 105 can be implemented through scripts that execute on a webpage and configure a browser to access and establish the websocket connection with the websocket interface 122 of the publishing engine 120.

For some clients that are not able to run the scripts (or establish websocket type connections), the system 100 can include polling interface 124. The polling interface 124 may be used to enable such clients to communicate with the system 100 using, for example, long polling or Javascript polling. The use of polling can enable non-websocket enabled clients, for example, to view and possibly interact with the content provider 110 in a live or semi-live format.

The system 100 can be implemented so that the community 107 of clients 104 can connect to the content provider 110 (e.g., website) to provide content submissions 117, as well as to receive content and real-time updates from the content provider 110. The content provider 110 can selectively implement programmatic components corresponding to the event handler 112 and the event queue 114 when the content provider 110 is operated in the real-time, interactive and community-based mode. When operated in the real-time, interactive and community-based mode, one or more of the clients 104 receive, or activate interface 105, to establish the corresponding websocket connection 121. The clients 104 that have the content resource (e.g., webpage) loaded can view the content resource 115 of the content provider 110 in an initial state. Subsequently, one or more of the clients 104 can provide content submissions 117 that modify or update the content resource 115. As described, the updates to the content resource 115 can be communicated to multiple clients 104 of the community in real-time, using the corresponding websocket connections 121.

The content submissions 117 are submitted to update or alter the content resource 115 from one or more clients 104. In one embodiment, the content submissions 117 are communicated to the content provider 110 using an HTTP call. However, in an alternative implementation, individual clients 104 can communicate content submission 117 to components of the content provider 110, such as the event handler 112, using the websocket connection formed between that client and the publishing engine 120. Thus, in such alternative variations, the websocket connections 121 can be used to broadcast updates to the content resource 115, as well to intake content submissions 117 which serve to update the content resource 115. In this way, the bi-directional aspect of the websocket communication 121 can be utilized to provide updated content to clients 104 of the community 107, as well as to receive content submissions from select clients 104.

According to some embodiments, the event handler 112 generates an input message 119 that is based on the content submission 117. The event handler 112 can parse the content submission 117 to identify and associate properties with the input message 119. The properties of the input message 119 can specify, for example, how a content of the content submission 117 is to be handled relative to an existing state of the content resource. For example, the event handler 112 can identify properties that correspond to the person or client, or class of person or client, who provided the content submission 117. The event handler 112 can also identify a property corresponding to the time in which the content submission 117 was received. Additionally, the event handler 112 can also identify properties that reflect how the content submission is to be handled with regard to other content that is existing with the content provider 110 at that time. For example, the event handler 112 can implement a set of rules, corresponding to schema 109, that identify a placement for a given content submission based on properties such as the person (or class) of person who provided the submission, as well as the time when the submission was received. For example, the schema 109 can specify that content submissions from a first user class are to be allocated to a specific region of the content resource, while contributions from users of another class are allocated to a different region. For example, the schema 109 can also specify that content submissions from, for example, a user of a particular class are only displayed if another condition is present (e.g., submission from another user or user class). The event handler 112 can use parameters associated with content submissions to associate properties with the input messages 119 that in turn enable implementation of the schema by the various clients of the community. The input message 119 can then be communicated to the event queue 114 with the identified properties, so as to enable real-time updates to the content resource in accordance with the schema.

In addition to processing the content submissions, components implemented with the content provider 110 can store the content resource 115 in a database 128, and update the content resource to copy the updates performed on the individual clients 104. In one embodiment, the event handler 112 stores changes to the content resource 115 as a result of the content submission 117. By storing the changes, the content resource 115 is viewable at a later time. Users can, for example, follow the history of the updates to the content resource 115, and/or view the content resource in its last or most recent state (e.g., after a most recent content submission is received and implemented).

During the real-time environment (initiated when, for example, websocket connections 121 are formed with the clients 104), the event monitor 130 interfaces with the event queue 114 to identify input messages 119. Each input message 119 can identify content elements that are to be added or changed, as well as one or more message properties that are determined from the corresponding content submission 117. The event monitor 130 communicates the input messages 119 from the event queue 114 to the publishing engine 120, which then broadcasts the messages to the clients 104 using the socket connections 121 (or through polling for some clients 104). In some implementations, the polling interface 124 uses polling communications (e.g., long-polling connections) with some clients to communicate the messages 119.

The clients 104 can receive the input message 119, and utilize the properties associated with the message 119 to determine how the content specified in that message is to be handled on that client. In one embodiment, the interface 105 for each client 104 includes rules or data (e.g., schema 109 or portion thereof) that identifies how the content specified with the message 119 is to affect the content resource 115 in its existing state at that moment. For example, the properties associated with the incoming message 119 can be associated with rules that identify a placement of the newly provided content (as specified in the incoming message 119) based on the identifier of the person who submitted the content, as well as the time stamp associated with the corresponding content submission. Thus, for example, the identifier of the person who submitted the content submission 117 may dictate which document element(s) are replaced or updated, or which page region is to provide the content of the incoming message 119.

In general, embodiments provide that the interfaces 105 of the clients 104 that comprise the community 107 can operate under similar rules (e.g., same schema), so that a content submission from one client 104 is replicated consistently on other clients 104. Such consistency can be based on the interfaces 105 of the respective clients 104 handling the input message 119 for the given content submission in substantially the same way.

In some embodiments, however, if one of the clients 104 receiving the message 119 is also the client that provided the submission, the rules implemented through the interface 105 may identify the situation, and handle the message 119 differently than other clients. For example, in one embodiment, a given client 104 may receive input from an editor-class user, who modifies the content resource 115 on that client. The modification to the client resource 115 can be communicated as a content submission 117 to the event handler 112. The resulting input message 119 from that content submission can be communicated to all of the clients 104 in the community. When the content submission 117 is communicated to the content provider 110 and publishing engine 120, properties associated with the corresponding incoming message 119 enable the interface 105 of the originating client 104 (where the content resource 115 was modified) to, for example, ignore the incoming message 119, while other clients 104 may process the incoming message and alter the state of the content resource accordingly.

In addition to communicating content updates, the system 100 can incorporate notifications 142 that identify session-level events, such as the initiation of the content provider being made live, or a count-down to when the live operation terminates. As an addition or alternative, the notifications 142 can also communicate when, for example, a content update is in progress (e.g., when event handler 112 starts receiving content updates from one of the clients 104 of the community 107). In the latter example, the use of the websocket connection 121 enables the publishing engine 120 to communicate notifications graphically or otherwise, as to the initiation of the content update.

Methodology

Figure 3:
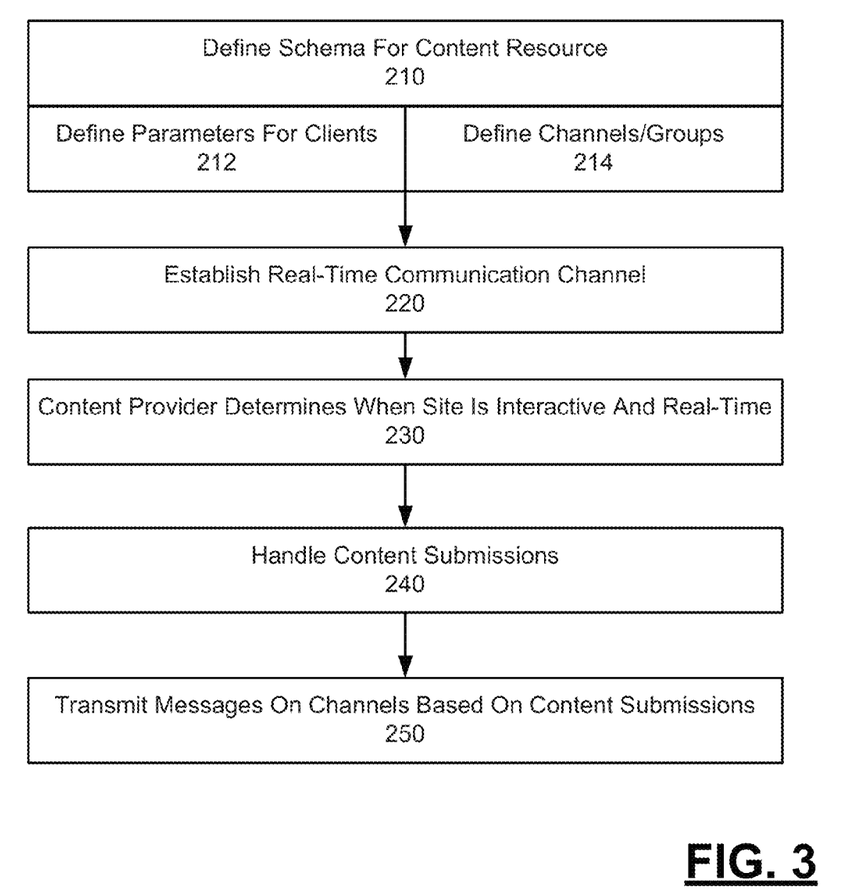
FIG. 3 illustrates a method for operating a website or other content provider in a real-time and interactive mode, according to an embodiment.

FIG. 3 illustrates a method for operating a website or other content provider in a live mode to reflect real-time updates to content provided from clients, according to one or more embodiments. A method such as described with an embodiment of FIG. 3 may be implemented using one or more components such as described with an embodiment of FIG. 2. Accordingly, reference may be made to elements of FIG. 2 for purpose of illustrating a suitable element or component for performing a step or sub-step being described.

A content publisher can define a schema that determines the structure of the content resource that is to be provided from the content provider's site (210). The schema can be based on parameters that define, for example, what content is to be published in real-time. Among other determinations and settings, the schema can also define how the site will handle content submissions from the community in general, how the site will handle content submissions from specific users or class of users, the layout of content (including newly provided content), and what content is to be pushed or made live to the browsers of the clients in the community.

In one embodiment, the schema defines parameters that are associated with specific clients 104, or with class of clients (212). For example, the parameters may specify clients that are editor-class users, for whom content submissions are re-broadcast in real-time. As an addition or alternative, the schema can also define different channels for a content provider (214). For example, a portion of content from the content provider 110 can be broadcast to one group of clients 104 within the community, while another portion of the content from the content provider can be broadcast to another group of clients.

With reference to FIG. 2, the schema can be incorporated in part by, for example, the event handler 112 and/or the event monitor 130. The event handler 112 can, for example, determine in real-time how to handle content submissions from the community-based on the class of the user that is submitting the content submission. The event monitor 130 can, for example, implement real-time broadcast of select content submissions to select clients or to the whole community, depending on the definitions of the schema. Likewise, the interfaces 105 of the individual clients 104 can implement data/rules consistent with the schema 109 of the content provider 110.

Additionally, the content publisher can implement or interact with a system such as described with FIG. 1 in order to establish a real-time communication connection or channel with its clients (220). The real-time communication channel can be message based, so that the content provider is able to message multiple clients using an existing channel when an event occurs. An example of a real-time, message based communication channel is a websocket, as defined most recently by RFC 6455, by the IETF. The use of websockets 121, as described with embodiments of FIG. 2, enable communication of input messages 119 in response to event monitor 130 detecting such messages residing in the event queue 114. Thus, embodiments provide that the clients 104 that receive a given input message 119, carrying a content update provided from one of the clients of the community, do not make requests for the message in advance, but rather receive the input message 119 automatically in response to the incoming message being queued. Furthermore, the incoming message 119 can specify elements or content changes that enable the content resource downloaded on the individual client 104 to be updated consistently with other clients, without the need for the individual clients to refresh (e.g., make a server request) for the updated content resource.

A content provider can elect the time or event when the site becomes real-time (230). For example, the content provider can select to make a site real-time and interactive to community input at a specific time of day, and for a specific duration of time. As another example, the content provider can select to make a site real-time and interactive in response to an event, such as a manual trigger from an administrator of the content provider. When made interactive and real-time, the content resource provided from the content provider can be modified, altered or updated based on community interaction (e.g., content submissions received from individual clients). The updates to the content resource can be broadcast in real-time to the clients 104 of the community, based on, for example, a set of predetermined rules, such as provided by the schema 109 (e.g., content submissions from select clients 104 is rebroadcast in real-time).

Once the site is operated in the real-time community interactive mode, content submissions are received and handled in accordance with the predetermined schema (240). In one embodiment, some clients 104 from the community 107 provide content submissions 117 through HTTP requests that are received by the event handler 112. In variations, however, the some or all of the clients can communicate the incoming messages 119 to the event handler 112 (and/or event queue 114) using the corresponding bi-directional websocket connections 121.

According to one or more embodiments, the event handler 112 can identify the parameters associated with the individual content submissions 117 (e.g., user or user class identifier), and associate properties with a corresponding input message 119 that defines how clients receiving the incoming message are to update their respective content resources. The properties provided with the input message 119 can designate, for example, elements that are to be updated or replaced on the webpage that the individual clients 104 have downloaded from the client provider 110. Select elements of the webpage can be updated without the individual browsers needing to refresh the page, or request elements for the page from a network server.

The input messages 119, representing the updates from the community to the content resource (e.g., webpage) of the content provider 110, can be transmitted to the various clients 104 of the community (250). For at least some clients in the community, the input messages 119 are communicated using the message based communication channel. For example, as described with an embodiment of FIG. 2, the individual clients 104 can establish a websocket communication with the publishing engine 120. For some clients, alternative polling techniques, such as long-polling can be used in place of a websocket. In this way, updates to the content resource from individual users are broadcasted to the community.

Online Debate Forum

Figure 4:
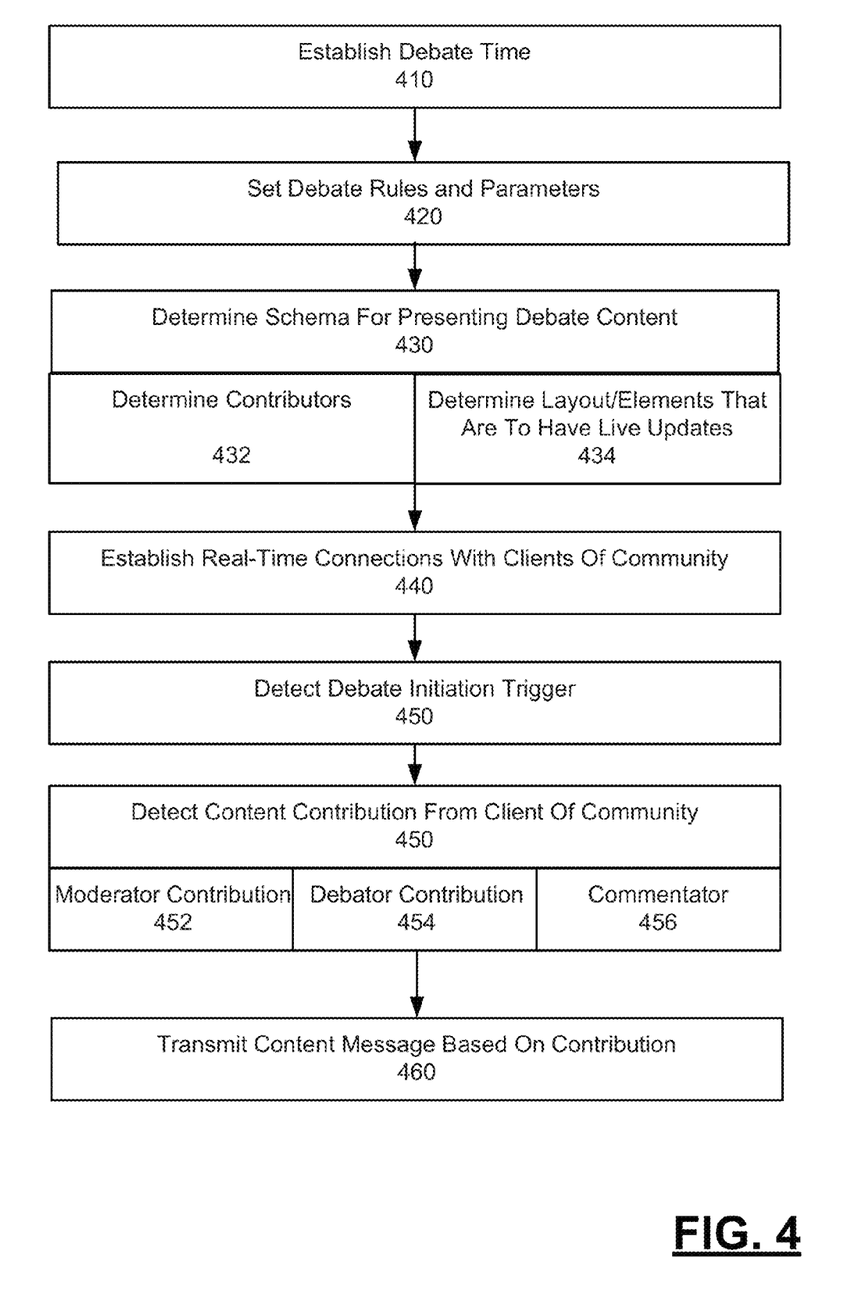
FIG. 4 illustrates a method for implementing a debate forum, according to an embodiment.

In some embodiments, a real-time online debate forum may be conducted using a system such as described with an embodiment of FIG. 2. FIG. 4 illustrates a method for implementing a debate forum, according to one or more embodiments. A debate forum such as described can be implemented for community of clients, including clients that are operated by moderator, debater, and audience.

In an embodiment, a content provider 110 can establish a real-time debate forum at a website. In establishing the debate forum, the content provider can define a set of rules and parameters for conducting the debate forum.

More specifically, the content provider can establish a time and duration for the debate (410). For example, the debate may be set to begin and end at a particular time of day. Additionally, the content provider can also specify a set of debate rules and parameters (420), such as the topic for the debate, which class of user can ask questions (e.g., monitor class user or anyone who is an audience to the debate), a time allotted for a debater to reply to a question, a time allotted for a debater to rebut an answer to a question, whether voting can be conducted as between debaters using audience members in order to determine a debate winner, etc.

The content provider may also set the schema for the manner in which content for the debate is to be presented (430). The schema can include rules and parameters that determine the layout, the text format of the debate content, the relative position of content elements to one another (e.g., positioning of question relative to debate answer) and designations as to what can be updated, what is to be updated in real-time for the community, and/or when are such updates allowed or to take place.

In an embodiment, the schema can also identify the clients of the debate community by class (432). Each class of client for the debate forum can have an associated set of debate rights. For example, the debate class designations can include identifying community participants that are part of the audience (e.g., debate rights to view content, to provide commentary, to vote on best answers or best debater), identifying one or more clients that are to be a moderator for the debate (e.g., debate rights to act as audience and to ask questions, to end answers or to adjust debate rules), and/or the debaters (e.g., debate rights to answer questions).

When the debate class of clients is defined, the schema may also determine what effect the individual content submissions are to have from clients of the different debate classes can also be predetermined (434). For example, the schema may specify that a content submission provided from a debater may be handled by associating the submission with a property that communicates, to each client, that the submission is to occupy a specific region of a webpage provided for that debater. Similarly, a content submission provided by a client that is a member of the audience can be designated for a commentary queue or panel that accompanies the webpage for the debate. A content submission provided by a client that is a monitor can be designated for a region of the webpage that is set aside for the moderator's questions or inputs.

Prior to the debate being initiated, real-time connections may be established with the clients that are to comprise the community (e.g., audience, participants) for the debate (440). As described with an embodiment of FIG. 2, the real-time connections may correspond to websocket connections that enable the clients of the community to receive real-time messages from the content provider. The content provider 110 provider can include programmatic components to detect and respond to content submissions. The websockets (or other real-time connection) enable the various submissions to be from the community to be communicated out to all clients of the community in real-time.

The debate can be triggered to begin (450). Depending on implementation, the triggers for the debate can include a set time, or an event (e.g., manual input from the user). Prior to initiation, the content resource (e.g., webpage) can be accessible to the clients of the community as, for example, a regular web page. After the debate is initiated, the webpage can become interactive for the community as a whole, based on, for example, the set rules (e.g., schema) that determine who can contribute and the manner in which the contributions are to be reflected in relation to existing or other content. Once contributions are received from individual clients, the contributions can be rebroadcast to other members of the community in real-time, using the established real-time connections.

Accordingly, contributions from individual clients of the community can be detected (450). Each contribution can be associated with a class of client who submitted the contribution. For example, the event handler 112 (see FIG. 2) can parse content submissions from the community to detect properties such as the user or class of user who submitted the content submission. In one example, the contribution can be identified as originating from a client that is a moderator (452), debater (454), or commentator (456). Once identified, an embodiment associates a property with the message that is generated to correspond to the submission.

The message can be communicated to all of the clients that are viewing or otherwise participating in the online debate (460) using the real-time connection. The properties associated with the message can identify the content element that are being added or changed to the existing webpage, as well as the class of the submitter. The particular content element that is being added or altered can be based on the class of the user who provided the submission. In an embodiment, each client can include an interface or other resource to enable that client to update the content resource based on a content element and property provided by a given input message, communicated over the real-time channel.

Figure 5:
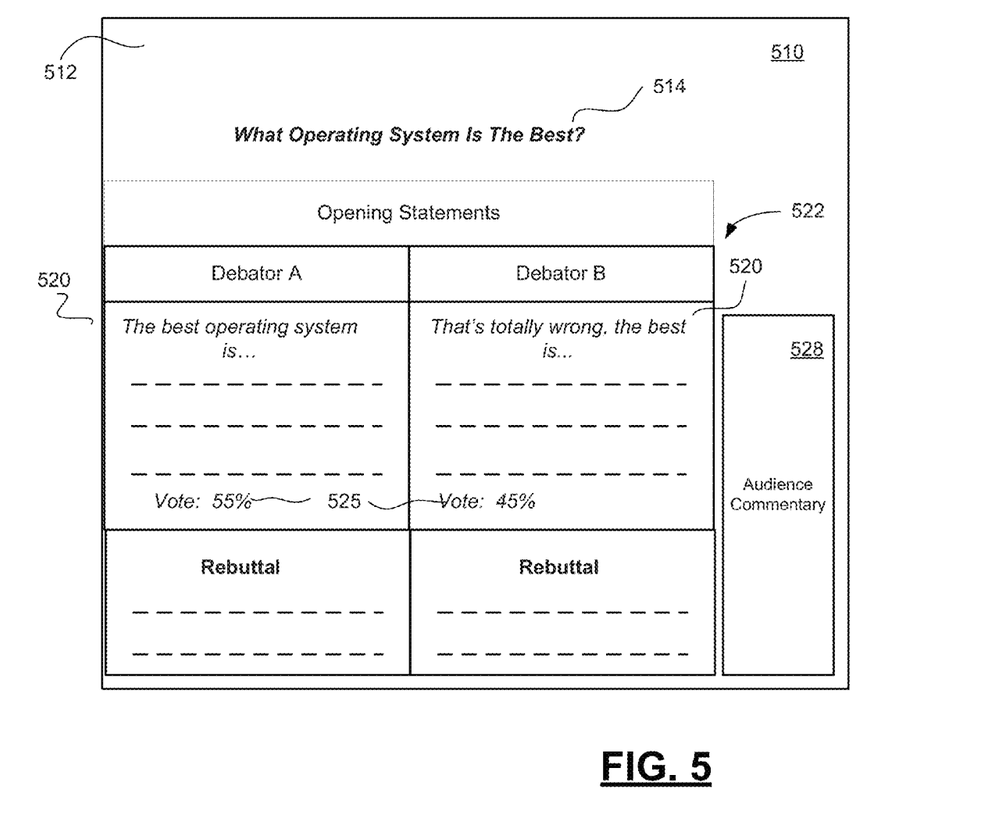
FIG. 5 illustrates an example of a real-time online debate forum, according to an embodiment.

FIG. 5 illustrates an example of a real-time online debate forum, such as described by an embodiment of FIG. 4, according to one or more embodiments. In FIG. 5, a content resource 510 corresponds to a webpage that originates from a content publisher. The webpage can include a framework 512 which designates a layout and other parameters for how content contributions are to appear. The manner in which content contributions are made to appear can be based at least in part on the schema, layout and/or debate rules, and can be predetermined.

In one embodiment, the debate forum that is conducted on the webpage can be provided in a point/counterpoint format. The debate may pertain to a central topic 514 that is presented on the webpage. Once the debate is initiated (e.g., submissions are enabled and communicated to the client community in real-time), sequenced or timed contribution events can occur as between moderator and two or more debaters. In the example provided, a Debater A can make one or more content submissions, such as, for example, an opening statement 520. With reference to system 100 and FIG. 2, the event handler 112 (see FIG. 2) or other component of system 100 can detect a contributions from the Debater A. For example, the contributions from the Debater A can be associated with a property that designates the portion of the overall layout where the content submission from that debater is to be presented (e.g., top left hand side). The corresponding content submission 117, provided from the client of Debater A, can be communicated in real-time as a message to clients of the community. The message may be associated with one or more properties that identify that Debater A is the contributor. Based on the property, each client is able to update the content resource 510 to include the contribution from Debater A.

Likewise, the contributions from the Debater B may be associated with a property that designates another portion 522 of the overall layout where the content submission from that debater is to be presented (e.g., top right hand side). Similarly, contributions from the moderator can be detected and associated with a property that causes the clients of the debate community to present the moderator input in, for example, a center region. In the example provided, those clients that are part of the audience can provide commentary, shown to be in a region 528 adjacent or to the side of the debater content.

The particular layout or format of the debate can vary. For example, other debate formats may assign more or fewer contributor roles to the community. Additional contributor roles can, for example, even further enhance the level of community interaction, and the ability of system 100 to deliver content submissions in real-time enhances the community interaction required for the debate forum. Various additional features can be provided as an additional or alternative part of a debate forum. For example, voting can be enabled amongst clients for individual questions. Each client can submit a vote as to which debater provided a best response to a question. The tallies for the voting 525 can also be displayed in real-time.

Other Usage Examples

In addition to debating forms, numerous other real-time, interactive forums can be enabled with embodiment such as described herein. For example, a messaging thread or forum may be maintained in a first state, where viewers or participants of the forum client terminals to make HTTP requests to view the content of the forum, and to provide submissions. Embodiments provide for such messaging forums or threads to be made interactive, in real-time. When made interactive, the messaging thread can be communicated to other clients that access the messaging forum. Clients can submit new posts for the messaging thread using a system such as described by an embodiment of FIG. 2. For example, a post from a client can be communicated to and event handler 112 as a content submission 117. An input message 119 may be generated from the content message, and then broadcast out to other clients that are logged in or otherwise viewing the messaging thread. The use of the input message can be communicated to the various clients using a web socket connection, so that the other clients receive an update to the messaging thread in real-time.

In another application, a live blogging page may be maintained using embodiment such as described herein. For example, a blogger may generate post or blog entries. An audience of the blogger can access the site, and received the blog entries in real-time. For example, blog entries generated from the blogger (or blogger contributors), can be communicated as input messages, using websocket channels, two other classic comprise the audience of the blog.

An online help desk can be maintained for groups of clients. For example, clients are experiencing problems of a particular kind may be forwarded to the webpage for assistance by one operator. Each client cast operator question is viewed by other clients, and the operator's response may be viewed by all. The exchange between individual clients and operator can be done in real-time, similar to other embodiments described herein.

Computer System

Figure 6:
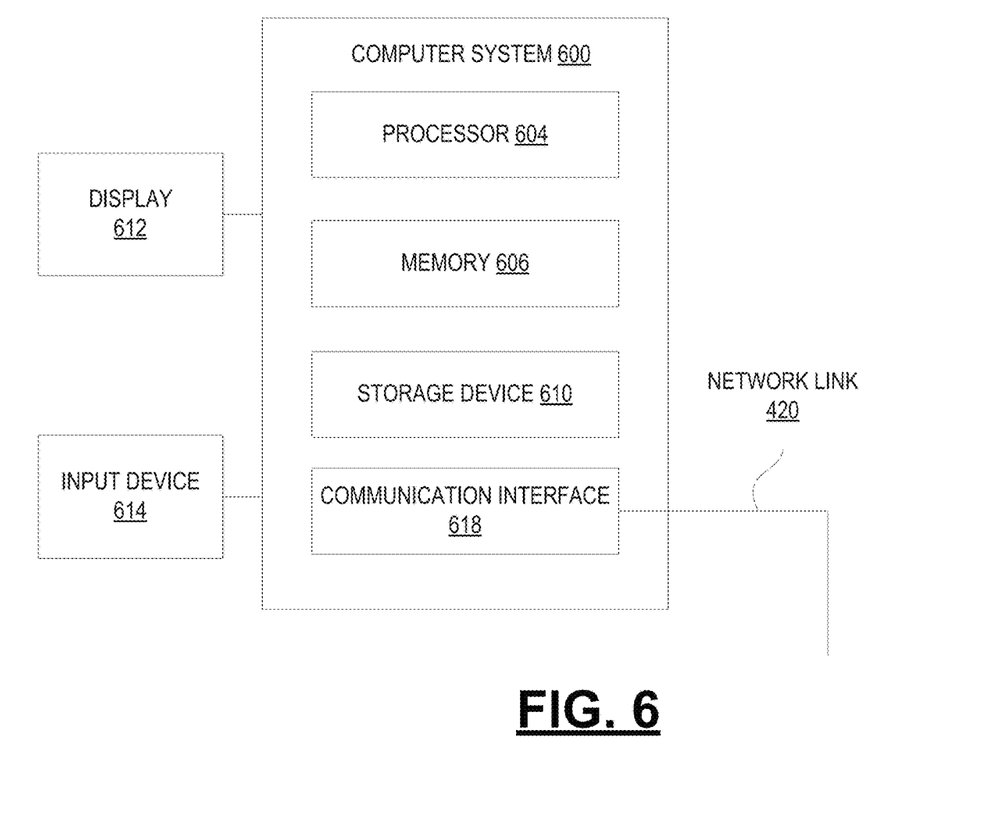
FIG. 6 is a block diagram that illustrates a computer system upon which embodiments described herein may be implemented.

FIG. 6 is a block diagram that illustrates a computer system upon which embodiments described herein may be implemented. For example, in the context of FIG. 2, system 100 may be implemented using one or more computer systems such as described by FIG. 6.

In an embodiment, computer system 600 includes processor 604, memory 606 (including non-transitory memory), storage device 610, and communication interface 618. Computer system 600 includes at least one processor 604 for processing information. Computer system 600 also includes a main memory 606, such as a random access memory (RAM) or other dynamic storage device, for storing information and instructions to be executed by processor 604. Main memory 606 also may be used for storing temporary variables or other intermediate information during execution of instructions to be executed by processor 604. Computer system 600 may also include a read only memory (ROM) or other static storage device for storing static information and instructions for processor 604. A storage device 610, such as a magnetic disk or optical disk, is provided for storing information and instructions. The communication interface 618 may enable the computer system 600 to communicate with one or more networks through use of the network link 620 (wireless or wireline).

Computer system 600 can include display 612, such as a cathode ray tube (CRT), a LCD monitor, and a television set, for displaying information to a user. An input device 614, including alphanumeric and other keys, is coupled to computer system 600 for communicating information and command selections to processor 604. Other non-limiting, illustrative examples of input device 614 include a mouse, a trackball, or cursor direction keys for communicating direction information and command selections to processor 604 and for controlling cursor movement on display 612. While only one input device 614 is depicted in FIG. 6, embodiments may include any number of input devices 614 coupled to computer system 600.

Embodiments described herein are related to the use of computer system 600 for implementing the techniques described herein. According to one embodiment, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method for providing interactive content, the method being implemented by one or more processors of a content provider and comprising:
   providing a content resource in an initial state to a plurality of client terminals;
   in response to a triggering event, establishing a websocket connection with each of the plurality of client terminals to render the content resource in an interactive mode;
   detecting real-time content submissions from one or more of the plurality of client terminals; and
   in response to detecting the real-time content submissions, sending a communication to each of the plurality of client terminals using the websocket connection to update the content resource to include one or more changes reflecting the real-time content submissions.

2. The method of claim 1, wherein the triggering event corresponds to one or more of a predetermined time of day or a manual input from an administrator of the content resource.

3. The method of claim 1, further comprising:
   for each of the real-time content submissions, associating the communication with one or more properties to indicate how the real-time content submission to be locally rendered on the updated content resource.

4. The method of claim 3, wherein the one or more properties include a class of user that submitted the real-time content submission.

5. The method of claim 3, further comprising:
   providing each of the plurality of client terminals with a set of rules that dictate how the client terminal is to locally update the content resource based on the one or more properties.

6. The method of claim 1, wherein each of the plurality of client terminals operates a browser to render the content resource in the initial state, and wherein the websocket connection enables real-time communication between the browser and the content provider without performing refresh operations.

7. The method of claim 1, wherein plurality of client terminals implement a script that enables each of the plurality of client terminals to establish the websocket connection with the content provider.

8. The method of claim 1, wherein the content resource corresponds to a webpage that receives the real-time content submissions from the one or more of the plurality of client terminals.

9. The method of claim 1, wherein the content resource includes a message thread, and wherein the method is performed for a discrete duration in order to enable the real-time content submissions to be contributed to the message thread in order to be presented in real-time to the plurality of client terminals during the discrete duration.

10. The method of claim 1, wherein the real-time content submissions are submitted to the content provider by two or more of the plurality of client terminals each real-time content submission being responsive to a topic or question provided on the content resource, the method further comprising:
    parsing each of the real-time content submissions to include properties in order to incorporate the real-time content submission in the communication sent to each of the plurality of client terminals over the websocket connection, wherein the sent communication causes the client terminal to locally update the content resource based on the real-time content submission.

11. A method for providing a debate forum, the method being implemented by one or more processors of a content provider and comprising:
    providing the debate forum in an initial state to a plurality of client terminals;
    determining one or more content contributors, from the plurality of client terminals, having a debate class designation for contributing debate content to the debate forum;
    for a discrete time-period, establishing a websocket connection with each of the plurality of client terminals to render the debate forum in an interactive mode, wherein the interactive mode enables a plurality of content submissions to be submitted by one or more of the plurality of client terminals having a monitor class designation; and
    in response to detecting each of the plurality of content submissions, sending a communication to each of the plurality of client terminals using the websocket connection to update the debate forum to include one or more changes reflecting the plurality of content submissions.

12. The method of claim 11, wherein sending the communication includes associating the communication with either the debate class designation or the monitor class designation to indicate how each of the plurality of content submissions and the debate content are to be locally rendered on the updated debate forum.

13. The method of claim 12, further comprising:
providing each of the plurality of client terminals with a set of rules that dictate how the client terminal is to locally update the debate forum based on the communication being associated with either the debate class designation or the monitor class designation.

14. The method of claim 11, further comprising:
setting a start time and an end time that defines the discrete time-period, wherein sending the communication to each of the plurality of client terminals is performed using the websocket connection in real-time during the discrete time-period.

15. The method of claim 11, wherein communications are sent to the plurality of client terminals in response to the debate content being received from client terminals having the debate class designation or the content submissions being received for client terminals having the monitor class designation.

16. The method of claim 15, further comprising:
using the websocket connection, communicating messages, corresponding to the debate content from the client terminals having the debate class designation and the content submissions from the client terminals having the monitor class designation, to the plurality of client terminals, the communicated messages including associated properties identifying a location on which to locally display the debate content and the content submissions on the debate forum.

17. The method of claim 11, wherein each of the plurality of client terminals operates a browser to render the debate forum in the initial state, and wherein the websocket connection enables real-time communication between the browser and the content provider without performing refresh operations.

18. The method of claim 11, further comprising:
providing each of the plurality of client terminals with an interface for locally establishing the websocket connection with the content provider.

19. The method of claim 18, wherein providing each of the plurality of client terminals with the interface includes providing a browser, operating on each of the plurality of client terminals, with a script that executes to provide the interface.

20. A computer system for providing interactive, the computer system comprising:
a memory that stores instructions; and
one or more processors that execute the instructions, causing the computer system to:
provide a content resource in an initial state to a plurality of client terminals;
in response to a triggering event, establish a websocket connection with each of the plurality of client terminals to render the content resource in an interactive mode;
detect real-time content submissions from one or more of the plurality of client terminal; and
in response to detecting the real-time content submissions, send a communication to each of the plurality of client terminals using the websocket connection to update the content resource to include one or more changes reflecting the real-time content submissions.

* * * * *